No. 888,770. PATENTED MAY 26, 1908.
T. L. VALERIUS.
CASED BOTTLE CAPPER.
APPLICATION FILED JULY 28, 1906.
6 SHEETS—SHEET 6.
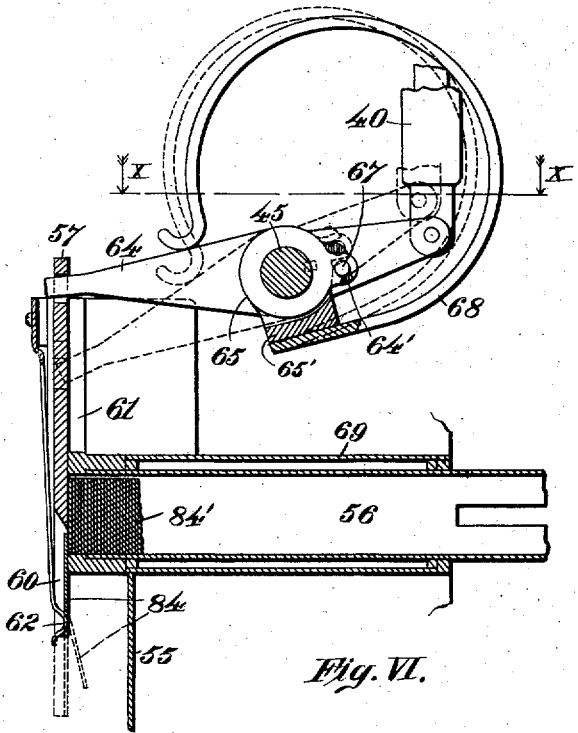
Fig. VI.
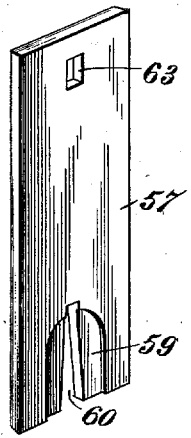
Fig. VII.
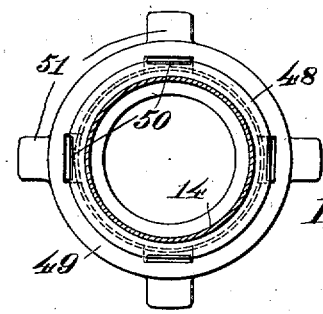
Fig. IX.
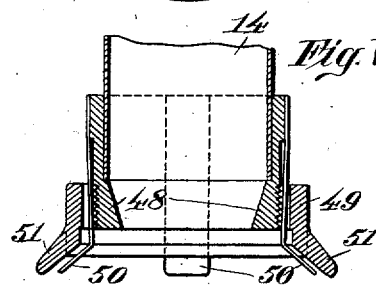
Fig. VIII.
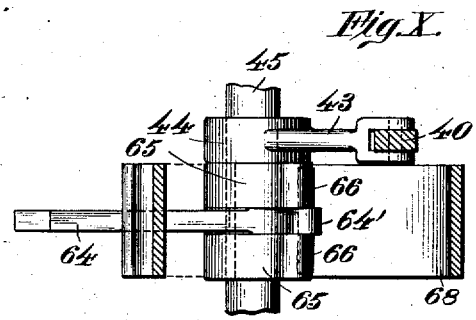
Fig. X.
Witnesses:
H. S. Austin
A. W. Nelson
Inventor
Theodore L. Valerius
By
Charles Bishop Hardy
Attorney

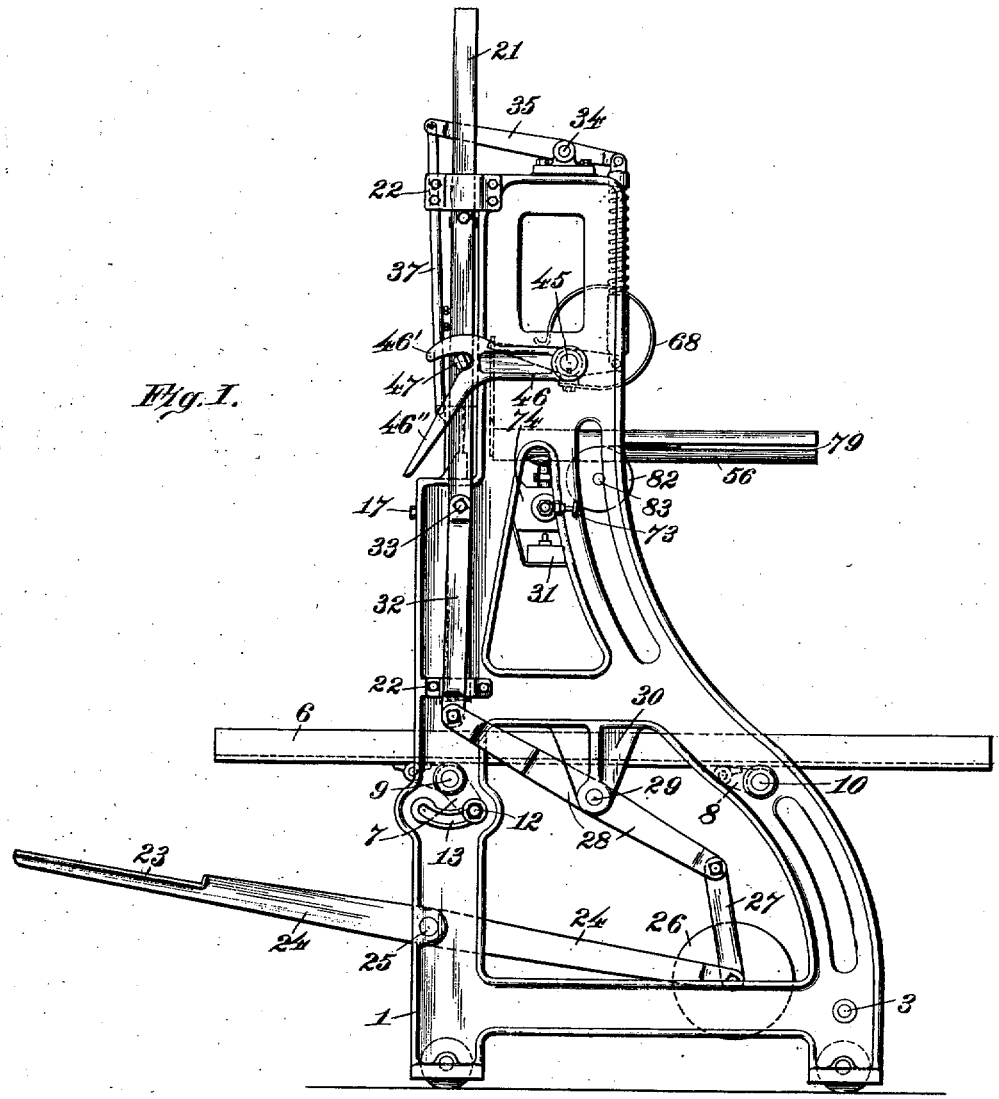

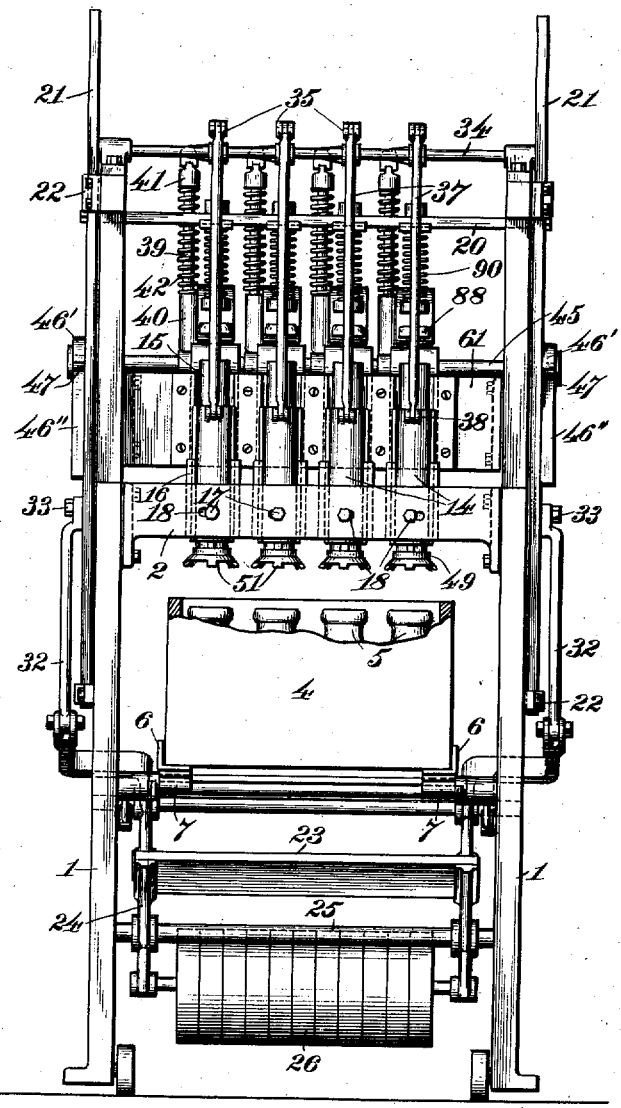

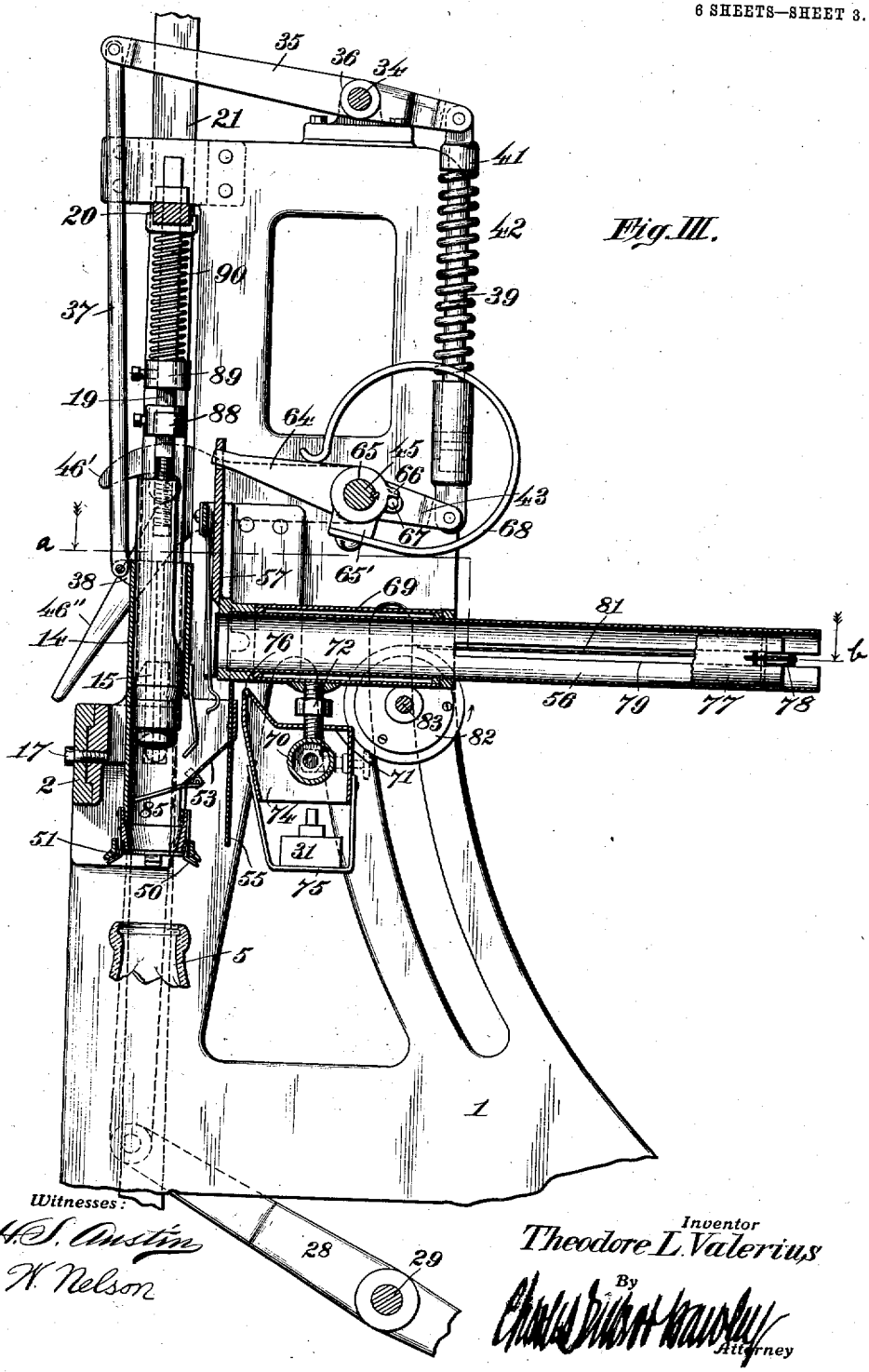

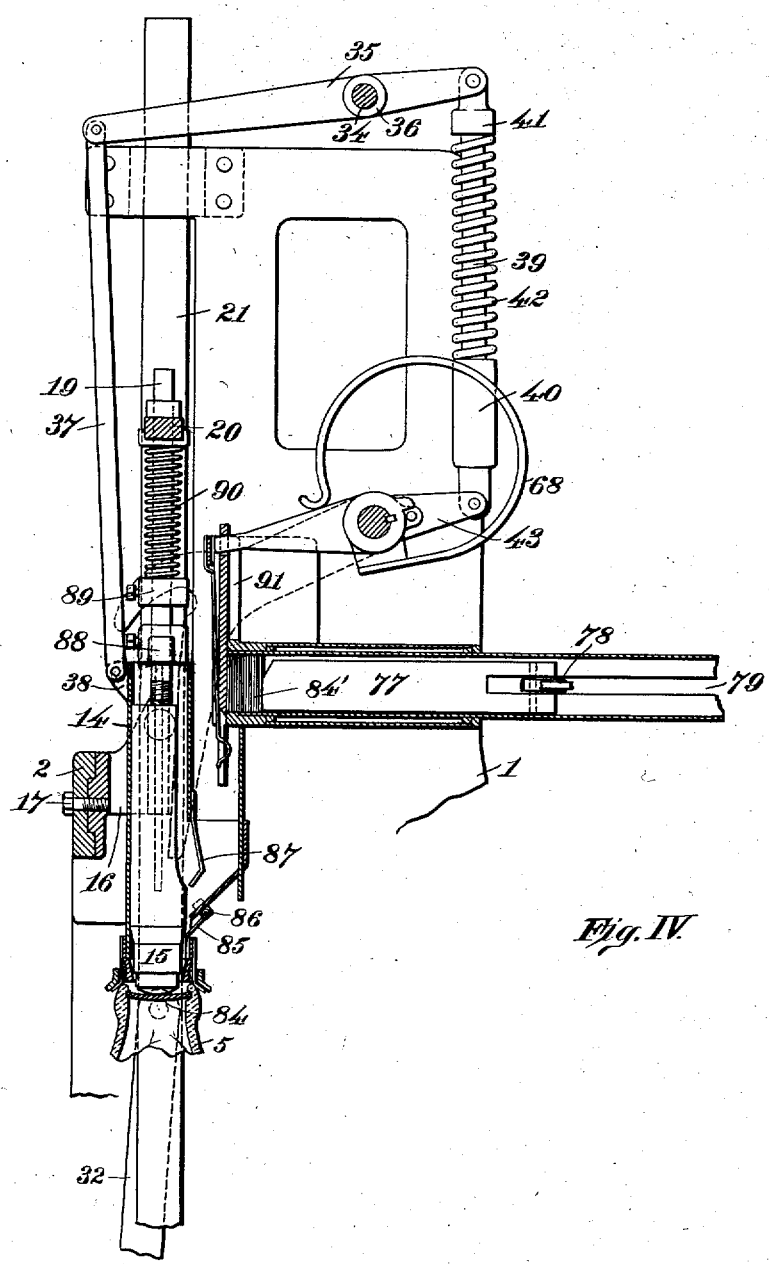
No. 888,770.
PATENTED MAY 26, 1908.
T. L. VALERIUS.
CASED BOTTLE CAPPER.
APPLICATION FILED JULY 28, 1906.
Fig. IV.
Witnesses:
H. J. Austin
A. W. Nelson
Inventor
Theodore L. Valerius
By
Attorney

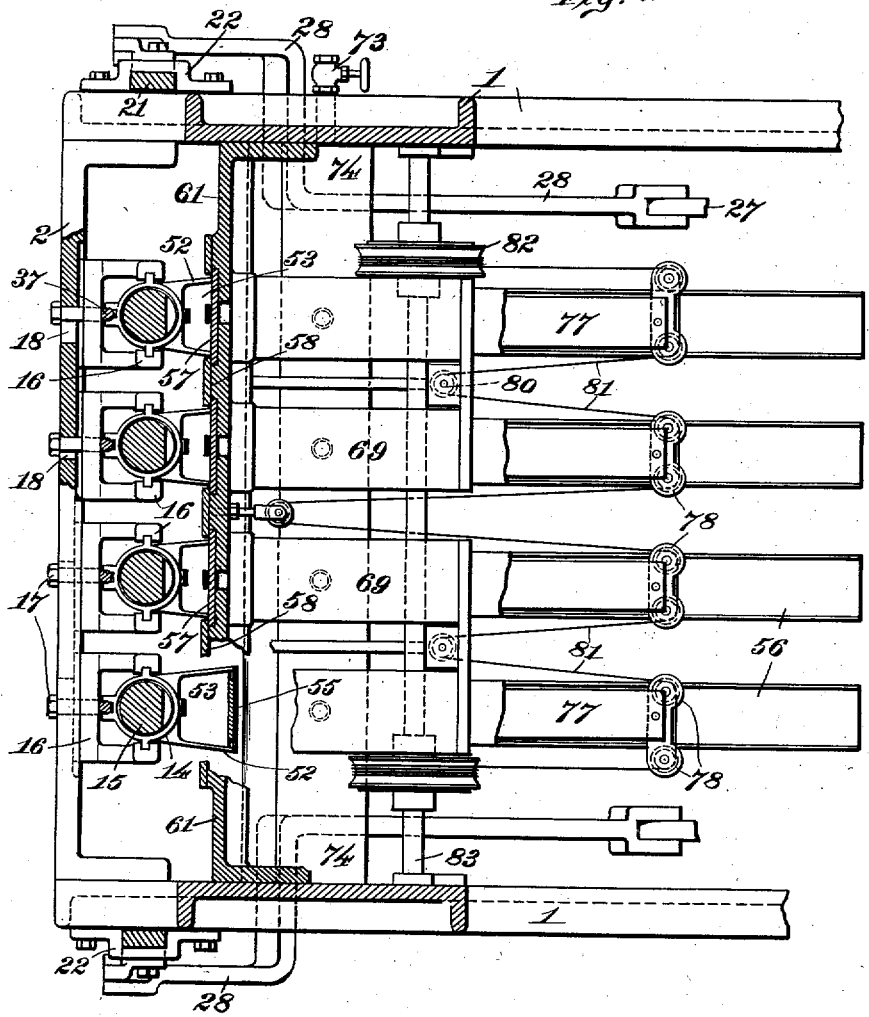

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

CASED-BOTTLE CAPPER.

No. 888,770.    Specification of Letters Patent.    Patented May 26, 1908.

Application filed July 28, 1906. Serial No. 328,226.

*To all whom it may concern:*

Be it known that I, THEODORE L. VALERIUS, a citizen of the United States, and residing at Fort Atkinson, in the county of Jefferson and State of Wisconsin, have invented a certain new, useful, and Improved Cased-Bottle Capper, of which the following is a full, clear, and exact description, such as will enable others skilled in the art to which it appertains to make and use the same.

My invention relates to improvements in bottle-capping or stoppering machinery, and has particular reference to improvements in machines for stoppering or capping wide-mouthed bottles such as milk bottles, by inserting the well known stopper-caps, of paper or other non-metallic material, into the internally grooved mouths of such bottles.

The object of my invention is to provide a simple and efficient mechanism for automatically capping milk or other wide mouthed bottles; and a further object of the invention is to provide a machine of the character named which will be adapted for capping filled bottles packed in the cases, racks, or boxes.

A further particular object of the invention is to provide a bottle-capping machine which will be adapted to operate with bottle caps prepared in the form of stacks or cylinders.

A further particular object of the invention is to improve the construction and arrangement of a cap-feeding machine with particular view to simplifying the method of feeding the caps from the reservoirs or magazines of the machine.

A further particular object of the invention is to so improve the construction of bottle capping machines that breakage of bottles by the capping devices will be avoided.

A further particular object of the invention is to provide a machine of the class mentioned, wherein practically all of the mechanical elements shall be yieldingly connected; to the end that any sudden, accidental stoppage of one or more elements of the machine shall not result in damage thereto.

A further particular object of the invention is to provide a machine which will be adapted for adjustment to, and use with, cased bottles of different sizes, reference being here had to the diameters and heights of the bottles, and not to the diameter of the mouths, which is uniform for half pint, pint, and quart bottles.

Other objects of my invention will appear hereinafter.

My invention consists generally in a bottle capping mechanism of the construction and arrangements of parts hereinafter described and fully pointed out in the claims.

My invention will be more readily understood by reference to the accompanying drawings, which form a part of this application, and in which Figure I is a right-hand side elevation of a mechanism embodying my invention; Fig. II is a front elevation of the same, showing a case of bottles in position; Fig. III is an enlarged sectional elevation of the upper portion of the machine, the follower being partly broken away; Fig. IV is a similar view, omitting certain parts, showing caps in the magazines and a follower in position; Fig. V is a sectional plan view taken on line a—b of Fig. III, certain parts being broken away; Fig. VI is an enlarged detail view in section of one of the cap-ejecting mechanisms, showing the parts in two positions; Fig. VII is a perspective view of one of the ejector-slides, detached; Fig. VIII is a vertical sectional detail view of one of the bottle-centering devices; Fig. IX is a plan view of Fig. VIII; Fig. X is a sectional view taken on line X—X of Fig. VI.

Machines have been devised for filling bottles in cases and a special object of my invention is to provide a bottle capping machine that shall be capable of handling the filled cases as they leave the bottle filling machines. Before proceeding to the description of the structure involved in the present invention I desire to state that I have hitherto devised a mechanism for making the caps which are used for stoppering milk and cream bottles, which machine delivers the caps in the form of long cylinders or sticks, the caps being joined by a coating of paraffin. It will be noted that the machine hereinafter detailed is capable of using these sticks of caps.

The frame of the machine as shown comprises two vertical castings, 1, suitably connected and braced, as for example, by transverse members, 2 and 3, (Fig. II). The frame may be mounted on rollers, as shown, to facilitate its removal from place to place.

The case 4, containing the bottles 5, is supported by a pair of forwardly and rearwardly extending bars, 6, which also act as guides for movement of the case by the operator. The case is supposed to contain a plurality of rows of bottles. Preferably, the bars, 6, are vertically adjustable, to permit the mouths of pint and quart bottles to stand at the same height. That is to say, when quart bottles are being capped the supports, 6, are lowered, and when pint bottles are being capped, said supports are raised. Any suitable adjusting device may be employed. As shown in Figs. I and II, the bars, 6, are supported by rocker-arms, 7 and 8, fixed upon two shafts, 9 and 10. One shaft, 9, is provided with a lever arm, 11, which carries a set-screw, 12, projecting through an arc slot, 13, in the frame. Thus, by throwing the set-screw to the opposite end of the slot, the supports, 6, will be moved upwardly and longitudinally, into position for the smaller size of bottles.

The aforesaid transverse frame member, 2, is located at a suitable distance above the bottles, and supports a row or series of tubular shells or plunger-guides, 14, in each of which is mounted a vertically-reciprocative plunger, 15. Said tubular guides, 14, are also vertically-reciprocative, and are provided with guide-ways, 16, most clearly shown in Fig. V. These guide-ways are secured to the crossbar, 2, by set screws, 17, and in order to provide for the aforesaid adjustment of the spacing of the plungers, the crossbar, 2, is provided with horizontally disposed slots, 18, through which said set-screws extend. Said slots are so proportioned that their ends act as gage-stops for the adjustment of the plunger-guides to the two sizes of bottles, as will readily be understood.

In order to permit the plunger-stems, 19, to stand vertically when in operation, whatever the adjustment of spacing for different sized bottles, the openings through which said stems pass, in drive-head, 20, are elongated correspondingly with the set-screw slots, 18, in frame-bar, 2. Whenever the set-screws, 17, are shifted, the stems, 19, are correspondingly shifted laterally with respect to the drive-head, 20.

The plungers, 15, (by which the caps are inserted into the bottle-necks) may be reciprocated by any suitable mechanism. As shown, they are actuated as follows: each plunger is provided with an upwardly-extending stem, 19, which passes loosely through a transverse drive-head, 20, the ends of which are supported and carried by a pair of vertical, reciprocative bars, 21, guided by guide-pieces, 22.

In the absence of means for driving the machine by power, I have provided means for driving it by pedal. As shown, a heavy treadle, 23, carried by levers, 24, is employed. Said levers are fulcrumed on a shaft, 25, and carry suitable counterweights, as 26. Levers, 24, are connected by pivoted links, 27, to a pair of levers, 28, fulcrumed at 29, on brackets, 30, and the forward ends of levers, 28, are pivotally connected to a pair of links or connecting-rods, 32, the upper ends of which are pivotally connected at, 33, to the slide-bars, 21. Thus, when the treadle is depressed the vertical slides, 21, and transverse drive-head, 20, will be depressed, through the intermediacy of the other parts named. The stroke of the drive-head, 20, (downward) should always be in excess of the downward stroke of the plungers, 15. To provide for this excess, the plunger stems are yieldingly connected to the drive-bar, 20, by devices hereinafter described, and stops, also hereinafter described, are provided for limiting the down strokes of the plungers so that the caps will not be driven past the grooves in the bottle-necks.

The plunger-guides, 14, are depressed, by suitable mechanism, upon the mouths of the bottles, just in advance of the descent of the cap-plungers. When the plungers ascend, the plunger-guides are raised, thereby permitting the removal or movement of the case of bottles to a different position. The preferred mechanism for thus actuating the plunger-guides is shown in detail in Figs. I, II, and III. A transverse rock-shaft, 34, near the top of the machine, serves as a fulcrum for a series of levers, 35, the hubs, 36, of which are laterally adjustable upon said shaft, and said levers are connected respectively to depending rods, 37, which are pivotally connected at their lower ends to lugs, 38, projecting from the plunger-shells or guides, 14. Pivotally connected to the opposite end of each lever, 35, is a telescopic connecting rod comprising an inner member, 39, and a sleeve member, 40, the latter being provided with a slot (indicated) in which plays a pin (indicated) projecting from the member, 39. Between the sleeve member, 40, and a shoulder, 41, on the other member, is a compression spring, 42, which holds the rod, 39—40, normally extended to its greatest length.

The end of member, 40, is pivotally connected to a rock-arm, 43, (see also Fig. 10), having a hub, 44, fixed upon a transverse rock-shaft, 45. As shown in Fig. II, the ends of rock-shaft, 45, carry two cam-arms, 46, which pass forwardly at the sides of the vertical slide-bars, 21, and are bifurcated, forming upper portions, 46', and lower, longer portions, 46". Each slide-bar, 21, carries a projection, 47, which may be either a stud or a roller; this projection takes into the recess between the cam-arm members aforesaid.

Means for actuating the slide-bars, 21, have already been described: their downward movement causes projections, 47, to depress the cam-arms, 46″, and thereby to rock the shaft, 45. This movement of shaft, 45, elevates the series of rock-arms, 43, which elevate the compressible rods, 39—40, which actuate the levers, 35, which depress the rods, 37, which depress the shells or plunger-guides, 14.

The lower end of each shell, 14, is provided with a bottle-registering device, shown in detail in Fig. IX. Subject to modification, it consists of a ring or collar, 48, mounted on the shell, 14, an outer ring, 49, threaded on ring, 48, and a suitable number of downwardly and outwardly projecting springs, 50. The springs are secured at their upper ends to the inner ring, 48; the outer ring, 49, is provided with stops, in the form of outwardly and downwardly directed lugs, 51, which overlie the lower portions of the springs, 50.

When a shell or plunger-guide, 14, is approaching the end of its down stroke (a bottle being approximately in position below it) the springs, 50, will impinge upon the mouth of the bottle, and by virtue of their inclination or angle of set, will automatically move the bottle into concentric position with the plunger-guide and the plunger itself. The further downward movement of the shell or plunger-guide, 14, causes the centering-springs, 50, to be forced outwardly, by the bottle mouths, against the lugs, 51. The downward movement of the shell or plunger-guide, 14, is thus arrested by the bottle, 5, said shell being now in the position illustrated in Fig. IV, but the plunger, 15, being in raised position, as illustrated in Fig. III.

Owing to the throw of the treadle, 23, which causes an excess of movement of the rock-arms, 43, at the end of each up-stroke thereof, it follows that the said movement of the rock-arms, 43, will raise the sleeve members 40, after the rod members, 39, have been arrested (as above explained), thereby compressing the springs, 42, which take up the continued motion of the actuating parts while transmitting a slightly increased pressure only, from the bottle-registering devices to the bottles. It will be clearly understood that the breakage of a bottle by the action of this mechanism is rendered impossible, owing to the fact that the down stroke of each shell or plunger-guide is arrested by the bottle, and the pressure of the parts upon the bottle is limited by the stiffness of the spring, 42.

As shown in Fig. III, a portion of the rear wall of the shell, 14, is cut away, and the sides thereof are extended rearwardly, as at, 52, and connected by an inclined bottom plate, 53. The sides, 52, and plate, 53, together form a runway or chute, through which the caps are delivered into the shell.

A stationary back plate, 55, is arranged in close proximity to the back of the chute. As shown, plate, 55, passes through a slot in the chute bottom, 53, and is supported by having its upper end secured to the cap magazine, 56, which will next be described. The function of back-plate, 55, is to prevent the caps from accidentally dropping outside of the chute, the latter being in its lowermost position when it receives the caps. It is to be observed that this magazine, 56, is disposed horizontally. This arrangement of the magazine is advantageous in several important respects. Primarily, it permits of the travel of all the reciprocating parts in the same direction: i. e., vertically. Again, said arrangement of the magazines permits of the hereinafter described partial heating of the magazines, which partial heating would be almost impracticable if the magazines were arranged vertically.

A further advantage is that the "sticks" of caps are more quickly and easily placed within the horizontal tubes; and other advantages, not herein expressly stated, arise from the said arrangement of parts.

The magazines, 56, correspond in number to the number of plungers, 15. Each magazine comprises a straight tube, preferably circular in section, adapted to hold a stick of the caps, which as already stated, is composed of caps adhering face to face by means of paraffin wax.

The front end of the magazine is located at a suitable distance above the chute, 52, when the latter is in its uppermost position, (Fig. III). The magazine is rigidly supported in any suitable manner, as for example, by being secured to a transverse bar, 61.

Referring now especially to Fig. V, it will be observed that a plurality of ejector-slides, 57, are mounted to traverse the front end of the respective magazines, 56. The guideways for said ejectors are formed preferably by recesses planed in the front face of the transverse bar, 61, the ends of which are secured to the side frames, 1. The ejectors are retained in said grooves by gibs or strips, 58, which overlap the edges of the slides, said strips being secured to the bar, 61, with screws, (not shown). Any preferred guides may be employed in lieu of the construction shown.

Each ejector-slide, 57, is formed, preferably, as shown in Figs. VI and VII. Its inner face, which makes contact with the end of the magazine, is provided with a recess, 59, the width of which is equal to or slightly more than the diameter of a cap, and the depth of which is approximately equal to the thickness of one cap. An open slot, 60, is cut through the slide from the lower end thereof to a point above the top of the cap-recess, 59. Slot, 60, provides clearance for a relatively fixed member, 62, attached by its upper end in any suitable manner, to frame-bar, 2. The function of this part is hereinafter described.

For reciprocating the slide, 57, any suitable mechanism may be employed. Such mechanism should include a yielding device which will, in case of "sticking" of the ejector slide, permit all other parts of the machine to execute their normal movements without strain or risk of breakage of any part. To this end I prefer to employ the slide-actuating mechanism shown in Figs. III, IV, VI, and X.

An opening, 63, in the ejector-slide, 57, receives the end of a rock-arm, 64, the hub of which is rotatably mounted on rock-shaft, 45, between two collars, 65, which are keyed upon said shaft. Each collar, 65, carries a projection, 66, and the rock-arm, 64, is provided with a rearward extension, 64', which carries two laterally projecting pins, 67, which underlie the collar projections, 66. Formed integral with the collars, 65, is a block, 65', provided for the attachment of a spring, 68, through which the initial rocking movement of shaft, 45, is transmitted to rock-arm, 64, (loose thereon) and thence to the ejector-slide, 57, causing the downward stroke thereof. The initial positions of the parts are shown in Fig. III. The ejector-slide, 57, is depressed to the position shown in Fig. IV, then raised by the downward action of lugs, 66, upon pins, 67, resulting in the lifting of rock-arm, 64. As shown, vertical slots, 91, are cut in the cross-bar, 61, for permitting the downward strokes of the ejector-actuating arms, 64.

The return movements of all the parts of the mechanism are actuated by the preponderance of weight of the counterweights over that of the treadle, when the operator's foot is removed from the latter.

For the purpose of facilitating the separation of the caps from the end of the "stick", it is desirable to provide means for keeping the wax in a softened or melted, or liquid condition, adjacent the discharge end of the magazine. One suitable and very effective heating device for that purpose is shown in section in Fig. III. The forward portion of each cap-tube, 56, is embraced by a water-jacket, 69, forming an annular water-chamber. The chambers are supplied with water through a transverse pipe, 70, to which they are connected by nipples, 71, and nuts, 72. Each end of pipe, 70, is provided with a hand-valve, 73. The water in the jacket, 69, is kept hot, by the circulation through the connecting nipples, 71, and the supply pipe. Thereby the wax between the caps in the included portion of the magazine is kept in a soft, or almost melted, condition. Loosely surrounding the pipe, 70 is an open bottomed sheet-metal heat-retaining chamber, 74. Any desired number of heating lamps or torches, 31, are supported below the pipe,
70, by U shaped pieces, 75, attached to the chamber, 74. The upper and front portion of said chamber is extended in the direction of the discharge end of the cap magazine, and a longitudinal aperture, 76, is cut in that portion of the chamber which is nearest the magazine. The heated air, passing up and out through said aperture, surrounds the extreme end of the magazine and keeps the same at a higher temperature than that portion covered by the water-jacket.

Suitable means of any preferred kind, are employed for feeding the "sticks" forwardly in the magazine as the caps are detached by the ejector-slides. As shown in the drawings this is accomplished as follows: Mounted slidably in each magazine is a follower-tube or rod, 77, hereinafter termed a follower. As shown in Fig. V, each follower carries upon its rearward end a pair of small grooved laterally projecting pulleys, 78, arranged in horizontal alinement. To permit the travel of said pulleys longitudinally of the magazine, the latter is cut by a pair of longitudinal slots, 79, open at their rearward ends. Between the magazine tubes are suitably supported grooved pulleys, 80, arranged in the same plane as the follower-pulleys, 78. A cord, 81, passes in zigzag manner around the follower-pulleys and the fixed pulleys alternately, as shown, and the ends of the cord are maintained under yielding tension by any suitable means, such as by weights or springs. In the construction as shown in Fig. V, the ends of the tension cord, 81, are wound upon two drums or spools, 82, rotatably mounted on a shaft, 83. Said shaft may be either fixed or rotatable. If rotatable, the drums, 82, will be fixed thereon, and a tension device applied to the shaft. If the shaft be fixed, the drums, 82, will be made hollow, and spiral springs will be housed therein, one end of a spring being connected to the shaft and its other end to the inner periphery of the drum urging the drums in the direction of the arrow in Fig. III. In either case, the object is to maintain sufficient tension upon the followers, 77, through intermediacy of the cord, 81, to cause the "sticks" to be fed toward the discharge ends of the tube as fast as they are consumed by the ejector-slides.

The operation of the machine is substantially as follows:—The magazines or cap-tubes are loaded with "sticks" of caps, and the followers placed in position behind them. The water-heating lamps having been lighted, the water in the water-jackets is brought to the proper temperature. The operator places a case of filled bottles upon the supporting guides, 6, in such a position that one of the transverse rows of bottles lies directly beneath the row of plungers above. If the plunger-guides are not adjusted for the size bottles to be capped, the operator loosens the set-screws, 17, adjusts the plunger-guides laterally, adjusts the plunger stems, 19, correspondingly, and tightens the set-screws. Manual adjustment of levers, 35, is avoided by making their hubs sufficiently loose on their shaft, 34, to permit of a slight lateral creeping of said hubs, during operation of the machine, after the spacing of the plungers has been changed, whereby said levers will assume neutral working positions between rods, 37 and 39. Depression of the treadle, 23, raises the counterweights, 26, and lowers the series of shells or plunger-guides, 14, through the successive action of links, 27, levers, 28, links, 32, vertical slides, 21, cam-arms, 46, rock-shaft, 45, rock-arms, 43, telescopic rods, 39—40, levers, 35, and connecting rods, 37. The down stroke of the shells, 14, is arrested by the bottles which are pressed upon by the springs, 50, and lugs, 51. Any bottle that may not be in correct register for capping is registered or centered by the action of the springs, 50. The rocking movement of rock-shaft, 45, has carried the spring, 68, toward the position shown in dotted lines in Fig. VI, depressing rock-arms, 64, and the ejector-slides, 57. The recess, 59, in each ejector-slide is occupied by one of the caps, 84. The partial down-stroke of the slide brings it into the position shown in full lines, (Fig. VI) in which one of the caps is shown as almost detached from the "stick", 84'. The remainder of the down stroke of the ejector, completely detaches the cap, which, striking the relatively fixed member, 62, is thereby pushed away from the face of the ejector, to which it has a tendency to adhere. Part, 62, is not necessarily resilient, or yielding, and may be as rigid as its thickness will permit. At the end of the down stroke, the parts assume the dotted-line positions, after which the ejectors ascend to their starting positions.

Referring now, to Fig. III: the cap falls upon the inclined chute bottom, 53, and slides upon a temporary supporting leaf, 85, carried by the chute, 53, pivotally attached thereto at, 86, and provided with a spring (not shown) or equivalent means for restoring it to normal position after the plunger ascends. A resilient guard, 87, may be attached to the rear side of the shell, 14, depending into the chute as shown, for preventing the cap from turning over as it falls. As soon as the cap arrives upon the leaf, 85, the plunger, 15, descends, pushing down the cap and turning the leaf, 85, laterally to the position shown in Fig. IV. When the plunger has forced the cap into the groove in the bottle-neck, as shown in Fig. IV, the plunger is positively and automatically stopped, irrespective of the continued motion of the treadle and other actuating parts. Said stoppage is effected by the impingement of the stop-lugs, 88, (see also Fig. II) carried by collars, 89, fixed upon the plunger-stems, 19, upon the upper end of the shell or plunger-guide, 14. But the transverse drive-head, 20, may continue to descend after the stoppage of the plungers. This continued motion is taken up by a helical spring, 90, encircling each plunger-stem, 19, and confined between a fixed collar, 89, and the lower face of the drive-head, 20. Likewise, the continued movement of the actuating mechanism, after the shells, 14, have completed their down-stroke, and the telescopic rod members, 39, have completed their up-stroke, is taken up by the compression of springs, 42, while the sleeve members, 40, slide upwardly on the rods, 39. The reverse movements of the actuating mechanism, elevate first the ejector-slides, 57, while the compressed springs, 90, and 42, expand. Then the shells, 14, and the plungers, 15, are elevated, and the operator shifts the bottle-case to bring the next row of bottles into position. The above described operations are repeated until all the rows of bottles in a case have been capped.

As numerous modifications of my invention will readily suggest themselves to one skilled in the art, I do not confine the invention to the specific construction herein shown and described.

Having thus described my invention, I claim as new and desire to secure by Letters Patent:

1. In a machine for capping bottles, a horizontally disposed cap-magazine, in combination with a vertically movable cap-ejecting mechanism and a vertically operable capping mechanism, substantially as described.

2. In a machine for capping bottles, a horizontally disposed cap-magazine, in combination with cap-ejecting plate occupying a vertical plane at the end of said magazine and capping mechanism, substantially as described.

3. In a machine for capping bottles, a horizontally disposed cap-magazine, a cap-ejecting mechanism, a reciprocating tubular shell having a cap-inlet, and a cap-seating plunger traversing said shell, substantially as described.

4. In a machine for capping bottles, a horizontally disposed cap-magazine, a cap-ejector, a reciprocating tubular plunger-guide having a cap-inlet, and a cap-seating plunger within said guide, substantially as described.

5. In a machine for capping bottles, a horizontally disposed cap-magazine, a cap-ejector, a tubular plunger-guide carrying a chute for the caps, and a cap-seating plunger within said guide, substantially as described.

6. In a machine for capping cased bottles, the combination, with a horizontally disposed cap-magazine, of a reciprocating cap-ejector traversing the end thereof, means for actuating said ejector, and a yielding device interposed between said actuating means and the ejector, substantially as and for the purpose set forth.

7. In a machine for capping bottles, a horizontal cap magazine in combination with a reciprocating cap-ejector comprising a plate having a recess of sufficient depth to receive one cap from said magazine, a device for dislodging successive caps from the said recess in the ejector during the final portion of the operative stroke of the ejector, bottle and cap holding means and a capping plunger.

8. In a machine for capping bottles, a reciprocating cap-ejector comprising a longitudinally slotted plate having a recess adapted to receive one cap from a magazine, and a member for separating each cap from said recess; one end of said member being fixed and its other end being free and projecting into the ejector-plate slot, substantially as described.

9. In a machine for capping bottles, a cap-magazine, and a heating chamber surrounding the discharge end of said magazine, in combination with a cap ejector and a capping mechanism proper, for the purpose set forth.

10. In a machine for capping bottles, a cap-magazine, in combination with a heating chamber surrounding the discharge end of the magazine, means for maintaining heat in said chamber, a cap ejector and a capping mechanism proper, substantially as described.

11. In a machine for capping bottles, a tubular shell or plunger-guide, a capping-plunger within the shell, cap-chute carried by the shell and discharging thereinto, and a guard within the chute, adjacent the plunger, substantially as described.

12. In a machine for capping bottles, a tubular shell or plunger-guide, a capping-plunger within the shell, a cap-chute carried by the shell and discharging thereinto, and a cap-supporting leaf yieldably mounted within the shell, said leaf normally extending across said shell and adapted to be displaced by the down stroke of the plunger, substantially as described.

13. In combination with a magazine for caps, an ejector-slide coöperating therewith, a rock-shaft, an arm loosely mounted on the rock-shaft and actuating said slide, yielding means carried by the rock-shaft for imparting the operative stroke to said slide, and positive means for returning said slide to starting position, substantially as described.

14. In combination with a magazine for caps, an ejector-slide traversing the same, a rock-shaft, a slide-actuating arm loosely mounted on the rock-shaft, a spring carried by the rock-shaft for imparting the operative stroke to said slide, and positive means carried by the rock-shaft for returning said slide to starting position, substantially as described.

15. In a machine for capping cased bottles of unequal sizes, a plurality of plunger-guides, cap-seating plungers passing through said guides, and means whereby the lateral distance between the plunger guides may be adjusted, substantially as described.

16. In a machine for capping cased bottles of unequal sizes at different times, a plurality of plunger-guides, cap-seating plungers passing therethrough, and means whereby the plunger-guides may be laterally adjusted toward and from each other, substantially as described.

17. In a machine for capping cased bottles of unequal sizes as different times, a plurality of plunger-guides, cap-seating plungers passing therethrough, and means whereby the plungers and plunger-guides may be laterally adjusted toward and from each other, substantially as described.

18. In a machine for capping cased bottles of unequal sizes at different times, a plurality of cap-seating plungers having stems, a plurality of guides for said plungers, transverse slotted members which support and guide the plunger-guides and stems respectively, and means to shift said guides and stems for changing the lateral spacing thereof, substantially as described.

19. In a machine for capping bottles, a horizontally disposed cap-magazine adapted to contain a stick of caps, a cap-ejector traversing the magazine, a follower adapted to feed the stick of caps toward the ejector, a vertically-disposed shell, and a cap-chute carried by the shell and subjacent to the ejector, substantially as described.

20. In a machine for capping bottles, a horizontally disposed cap-holder adapted to contain a stick of caps, a cap-ejector traversing the cap-holder, a follower within the cap-holder, a vertically disposed shell provided with a bottle centering device, a cap-chute carried by and discharging into the shell and subjacent to the ejector, and a cap-seating plunger working within the shell, substantially as described.

21. In a machine for capping cased bottles, a plurality of horizontally disposed cap-magazines each adapted to hold a stick of caps, followers within the respective magazines, and means common to the followers adapted to force the same toward the discharge ends of the magazines, substantially as described.

22. In a machine for capping cased bottles, a plurality of horizontally disposed cap-magazines each adapted to hold a stick of caps, followers mounted within the magazines, respectively, said followers being provided with pulleys, a cord engaging the pulleys, and means for tensioning the cord to exert a constant pressure by the followers upon the sticks of caps, substantially as described.

23. In a machine for capping bottles, a vertically reciprocating shell, a cap-seating plunger within the shell, a horizontally-disposed cap-magazine, a reciprocating cap-ejector, and pedal-actuated mechanism for operating the aforesaid instrumentalities, substantially as described.

24. In a machine for capping bottles, a vertically reciprocating shell, a cap-seating plunger within the shell, a cap-magazine disposed at substantially a right angle to said plunger, a reciprocating cap-ejector substantially parallel to said plunger, means to depress the shell upon the neck of a bottle, and simultaneously acting means to operate the cap-ejector and depress the plunger thereafter, substantially as described.

25. In a machine for capping bottles, a vertically-reciprocating shell having a cap-chute which discharges thereinto, a horizontal cap-magazine adapted to discharge into said chutes, a reciprocating cap-ejector positioned above said chute and traversing the end of the magazine, a cap-seating plunger within said shell, means to depress the shell upon the neck of a bottle, and means to operate the cap-ejector and depress the plunger thereafter, substantially as described.

26. In a machine for capping bottles, a tube or magazine, adapted to hold caps; a heater upon a portion of said tube; a cap ejector and capping means, substantially as described.

27. In a machine for capping bottles, a plurality of horizontally disposed tubes each adapted to hold a stick of caps; a hot-water jacket surrounding a portion of each tube; a supply pipe; a hot-air chamber partially inclosing said pipe; connection between said pipe and the respective water-jacket; and heating means arranged below said pipe, substantially as described.

28. In a machine for capping bottles, a bottle-registering device comprising a vertically-moving shell, a plurality of outwardly and downwardly projecting spring fingers carried by the lower end of the shell, and a plurality of similarly-arranged lugs, rigidly carried by the shell and overlying said fingers, substantially as described.

29. In a machine for capping bottles, the combination with a cap-seating device, of a vertically moving shell, a plurality of outwardly and downwardly projecting spring fingers carried by the lower end of the shell, and a plurality of similarly-arranged lugs, rigidly carried by the shell and overlying said fingers, substantially as described.

30. In a machine for capping bottles, the combination of a vertically reciprocating shell and plunger-guide, a plunger within the shell, plunger - actuating mechanism, and shell - actuating mechanism comprising: a shaft, a lever fulcrumed thereon, a rod connecting the lever to the shell, a rock-shaft, a telescopic spring extended rod connecting said lever to an arm actuated by the rod-shaft, a second arm for actuating the rock-shaft, a vertically reciprocating member actuating said second arm, and means to actuate said vertically reciprocating member, substantially as described.

31. In a machine for capping bottles, the combination of a vertically reciprocating plunger having a stem, a vertically reciprocating cap-ejector, a plunger drive-head through which the plunger-stem freely passes, a yielding pressure-transmitting device between said drive-head and the plunger, a rock-shaft, an ejector-actuating arm carried by said shaft, a bifurcated arm mounted upon said shaft, and a vertically reciprocating bar, rigidly secured to said plunger drive-head and actuating the same, and carrying projections which engage said bifurcated arm to actuate the same.

32. In a machine for capping bottles, the combination of a vertically reciprocating shell and plunger-guide, a vertically reciprocating cap-ejector, a lever, a rod connecting the lever to the shell, a rock-shaft, an arm carried thereby, a telescopic spring-extended rod connecting the arm to the lever, an ejector-actuating arm loosely mounted on the rock-shaft, a spring and a lug carried by the rock-shaft, said spring bearing upon the ejector-actuating arm, said arm having a projection which is engaged by said lug at each backward movement of the rock-shaft, which movement elevates the cap-ejector and the shell, substantially as described.

33. In a machine for capping bottles, the combination of a horizontally disposed cap-magazine, a vertically reciprocating cap-receiving shell, a cap-chute carried by and discharging into the shell, and a stationary, upright back-plate supported by the magazine in contact with the upper edge of the chute bottom, substantially as and for the purpose specified.

34. In a machine for capping bottles, the combination of a horizontally disposed cap-magazine, a vertically reciprocating cap-receiving shell, a cap-chute carried by and discharging into the shell, a stationary upright back-plate supported by the magazine in contact with upper edge of the chute bottom, and a guard held by the shell and projecting downwardly into the chute at a proper distance from the chute bottom, substantially as described.

35. In a machine for capping bottles, the combination of a horizontally disposed cap-magazine, a vertically reciprocating cap-receiving shell, a cap-chute carried by and discharging into the shell, a stationary upright back-plate supported by the magazine in contact with the upper edge of the chute bottom, and a yieldingly mounted temporary cap-support normally extending across the shell in the path of the plunger and adapted to be displaced by the down stroke of the plunger, said support automatically rising when so permitted by the ascent of the plunger, substantially as described.

36. In a machine for capping bottles, a vertically reciprocating shell and plunger-guide, a cap-chute carried by and discharging into the shell, and a resiliently-mounted temporary cap-support normally extending across the shell in the path of the plunger and adapted to be displaced by the descent of the plunger and automatically rising when so permitted by the ascent of the plunger, substantially as described.

37. In a machine for capping bottles, a row of vertically reciprocating shells, a row of vertically reciprocating capping plungers within the shells, a row of cap-magazines horizontally arranged to feed the respective shells, cap-ejectors, chutes to convey the caps into the shells, means to simultaneously operate all of the shells, means to simultaneously operate all of the plungers, means to simultaneously depress all of the cap-ejectors, and means to simultaneously raise all of the cap-ejectors to starting positions, substantially as described.

38. In a machine for capping bottles, a row of shells, a row of capping plungers within the shells, a row of cap-magazines horizontally arranged to feed the shells, chutes to convey the caps into the shells, mechanism, comprising yielding devices, for operating all of the shells, mechanism, comprising yielding devices, for operating all of the plungers, and mechanism, comprising yielding devices, for operating all of the cap-ejectors, substantially as described.

39. In a machine for capping bottles, a cap magazine and a cap ejector, in combination with a tubular shell or guide, a capping plunger operable within said shell or guide, said shell and said plunger being vertically movable, and an inclined cap chute carried by said shell, movable with relation to said magazine and positioned to receive caps from said magazine, substantially as described.

40. In a machine for capping bottles, a frame, in combination with a vertically reciprocating shell guided thereon, means at the lower end of said shell for automatically centering a bottle and holding the same during the capping operation, means for reciprocating said shell, a spring interposed between the shell and the reciprocating means to prevent bottle breakage, means for feeding a cap into the lower part of said shell, a plunger operable in said shell to seat the cap in a bottle, plunger operating means, and a spring interposed between the plunger and its operating means, substantially as described.

41. In a machine for capping bottles, a frame, in combination with a bottle case supported thereon, rows of independently movable vertical shells arranged above said support, a bottle centering device upon the lower end of each shell, means for feeding caps into said shells, plungers in respective shells, respective operating members yieldingly connected with respective individual shells and plungers, and means for actuating said operating members successively, substantially as described.

In testimony whereof, I have hereunto set my hand, this 23 day of July, 1906, in the presence of two subscribing witnesses.

THEODORE L. VALERIUS.

Witnesses:
  SANFORD P. STARKS,
  IRVING R. HIPPENMEYER.